Figure 1:
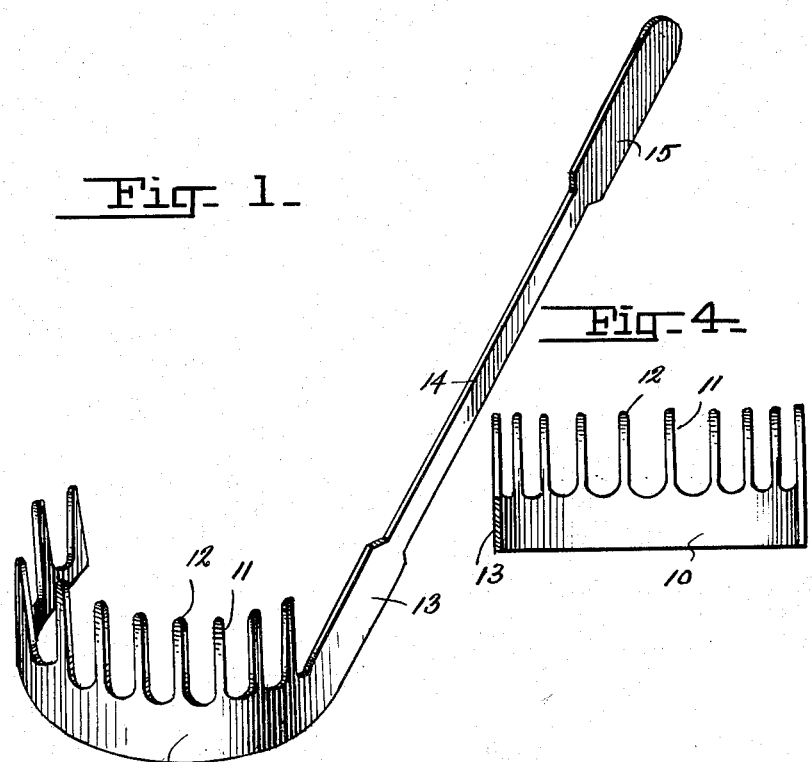

Dec. 25, 1956  HAJIME INOUYE  2,775,477
SPAGHETTI AND NOODLE SCOOP

Filed March 18, 1955

INVENTOR.
HAJIME INOUYE
BY
*Patrick D. Beaver*
ATTORNEY

United States Patent Office 2,775,477
Patented Dec. 25, 1956

2,775,477

SPAGHETTI AND NOODLE SCOOP

Hajime Inouye, Seattle, Wash.

Application March 18, 1955, Serial No. 495,153

1 Claim. (Cl. 294—49)

This invention relates to improvements in culinary devices and more particularly to a device for lifting spaghetti or noodles from hot water.

The principal object of the invention is to provide a very simple and inexpensive device whereby spaghetti and noodles can be efficiently and conveniently lifted from the hot water in which they have been cooked.

Another important object of the invention is to provide an item of the character stated which can be stamped and formed from a single piece of metal at a very low monetary figure.

These and various other objects and advantages of the invention will become apparent to the reader of the following description.

Figure 4:
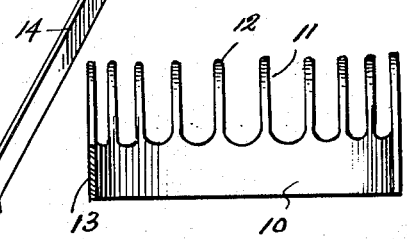
Figure 2:
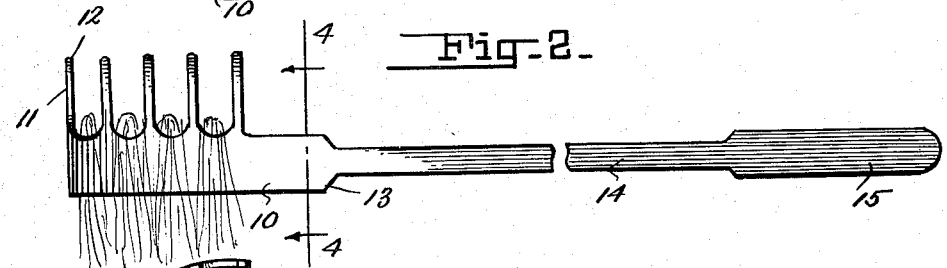
Figure 3:
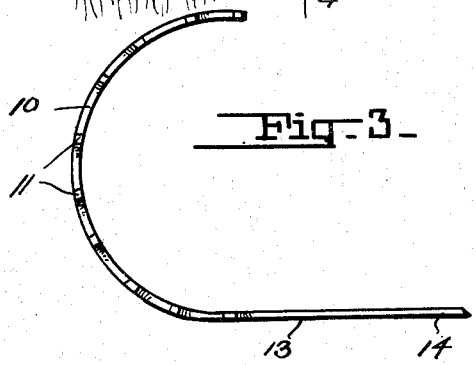

In the drawing:

Figure 1 is a perspective view of the device.
Figure 2 is a side elevational view.
Figure 3 is a fragmentary top plan view.
Figure 4 is a section taken on line 4—4 of Figure 2.

Referring to the drawing wherein like numerals designate like parts, it can be seen that this culinary device is stamped from a single sheet of suitable metal and formed, all perhaps in a single operation.

This metal sheet is stamped to provide an arcuate member 10 having a plurality of upstanding suitable spaced teeth 11, preferably tapered at their upper ends as at 12. This arcuate comb-like structure has the teeth upstanding and from one end of the portion 10 which may be referred to as the back, an elongated shank 13 extends, as shown in Figure 2. This may have a reduced intermediate portion 14 and a widened handle portion 15 at its free end. The comb-like structure is arcuate to the extent of approximately one hundred and eighty degrees, which is borne out by the plan view of Figure 3.

In the use and operation of this device, the handle 15 is grasped and the comb-like head portion dipped into a saucepan containing spaghetti or noodles. The head portion is drawn through the foodstuff and lifted, the spaghetti or noodles being suspended on the back 10 and between the teeth 11. Thus the spaghetti or noodles can be transported from a cooking utensil to a dish or other receptacle from which the foodstuff will be ultimately served.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

A culinary device for lifting spaghetti, noodles and like food-stuffs comprising an elongated sheet material member divided into a handle portion and a working head, said working head being in the form of an arcuate semi-circular arm extending from the handle portion of the material and being formed therewith and a plurality of upstanding and spaced teeth on the upper edge of said working head.

References Cited in the file of this patent

UNITED STATES PATENTS

| | | |
|---|---|---|
| 2,588,579 | Schneider | Mar. 11, 1952 |
| 2,664,630 | Lawson | Jan. 5, 1954 |

FOREIGN PATENTS

| | | |
|---|---|---|
| 446,406 | Great Britain | Apr. 29, 1936 |